Patented Nov. 1, 1949

2,486,456

UNITED STATES PATENT OFFICE 2,486,456

TREATMENT OF ACIDIC COMPOSITIONS

Carl N. Zellner, New Providence, N. J., assignor to Tide Water Associated Oil Company, Bayonne, N. J., a corporation of Delaware No Drawing. Application August 20, 1947, Serial No. 769,761

11 Claims. (Cl. 260—452)

This invention relates to a method for recovering or separating acids from complex organic mixtures. More particularly, the invention is concerned with the treatment of complex acidic organic mixtures which may contain polyfunctional oxygenated compounds to improve the yield of acids recoverable therefrom.

The method of this invention has particular effectiveness when applied to the treatment of certain acidic compositions comprising, in intimate mixture, dibasic and monobasic acid substances of various molecular weights and other mono- and di-functional organic compounds. It is especially adaptable to the recovery of dibasic acids from the crude oxidation product, or suitable fractions thereof, resulting from liquid phase oxidation of hydrocarbons with a free-oxygen-containing gas, as for example, air, oxygen, and the like. Hence the present invention will be described herein in illustrative embodiment in its application to the treatment of such hydrocarbon oxidation products.

The crude hydrocarbon oxidation products embodied for treatment are highly acidic and have a saponification value of at least about 400 mgms. KOH per gram, as for example, 500-625, and contain a substantial amount of dibasic acids and/or certain potentially acid components convertible to dibasic acids. Such desirable crude oxidation-products may be obtained by liquid phase oxidation of hydrocarbons to the extent of formation of dibasic acid constituents in preference to monobasic acids. Illustrative thereof are oxidized hydrocarbon products described, and prepared in the manner set forth, in my copending application Serial No. 625,961, filed October 31, 1945. Hence, the crude oxidation products, as embodied for treatment herein, are distinguishable from the hydrocarbon oxidation products known to the art which have saponification values materially lower than about 400 mgms. KOH, and hence, contain no dibasic acids or, if any, not more than a trace of such acids or potentially acid constituents convertible to dibasic acids. Moreover, the crude oxidation products, as embodied for treatment herein, are also distinguishable from the oxidation products resulting from nitric oxide and nitric acid oxidation of hydrocarbons in that the oxidation products embodied herein are more heat sensitive and contain partially oxidized intermediates that inhibit crystallization of dibasic acids present therein. Oxidation of hydrocarbons with nitric acid or nitrogen oxides destroys these intermediate partially oxidized materials and produces products that do not present the resinification problems of the crude oxidation products as embodied herein for recovery of high yields of dibasic acids.

With further reference to the crude oxidation products embodied for treatment as embodied herein, these products contain simple and complex polyfunctional and monofunctional compounds in intimate mixture. Water-soluble and water-insoluble dibasic acids of the succinic acid series ranging from 4 to about 20 carbon atoms are present therein in free state in limited amounts, and as acidic compounds containing groups other than, or in addition to, carboxyl groups. The exact structure of all compounds making up this complex oxidation mixture is presently unknown, but analysis thereof for functional groups indicates the presence of ester and lactonic linkages as well as carboxyl groups. Relatively few free hydroxyl groups are contained in these reactor products, and free aldehyde, ketone groups and anhydrides appear to be virtually absent. Dibasic acids of the succinic acid series may be crystallized out only in limited amounts by simple cooling of the crude oxidation product. Extraction of the oxidation product with water to separate water-insoluble and water-soluble components often gives rise to troublesome emulsions.

It is desired to increase the acid yield, particularly dibasic acids, and improve the recovery of such acids from complex mixtures as described hereinbefore. One suitable method for obtaining such improved yields comprises subjecting the aforedescribed acidic mixtures to a controlled or selective heat treatment.

Although improved results are obtained by the pyrolysis method, I have found that still higher yields of dibasic acids are obtainable by employing the method of the present invention, which, in broad aspect, comprises subjecting the acidic mixture to a controlled or selective pyrolysis in the presence of a catalyst. The actual conditions employed in the method of this invention may vary somewhat, depending upon the particular apparatus and type of charge material employed, and the exact results desired, but in general, the selective catalytic pyrolysis is so regulated as to break down or convert certain potentially acid components to free acids, raise the ratio of acid value to saponification value, and to remove or decompose certain crystallization-inhibiting substances without causing substantial, if any, decarboxylation of the desired dibasic acids. Essentially, this is brought about in pyrolysis, in the presence of a catalyst, by suitable control of the temperature and of the period of time at which the crude oxidation product is allowed to remain at such temperatures; these two factors being correlated in that, generally speaking, the higher the temperatures employed, the shorter is the time required. Although temperatures lower than about 200° C. and higher than about 400° C. may, under certain conditions be suitably employed, I prefer, in my practice of the invention to use temperatures in the range of about 200 to 400° C. Use of temperatures within this range have been found to provide highly satisfactory results as embodied herein. Although temperatures higher or lower than the foregoing range may, under some circumstances be employed, higher and lower temperatures are not generally preferred as excessively high temperatures tend to increase material losses whereas use of lower temperatures increase the reaction time. In a preferred embodiment, the charge is maintained at the desired reaction temperature for a relatively short period which may be only a matter of a few seconds. For example, when using a temperature of about 200 to 400° C. highly satisfactory results may be obtained by maintaining the charge in contact with the catalyst for about 0.5 to 5 seconds, the shorter contact times being employed at the higher temperatures. In my practice of the invention, I have found that use of a catalyst in the pyrolysis treatment not only markedly increases the yield of dibasic acids from the aforedescribed acidic mixtures, but also facilitates the separation, as by filtration, of the dibasic acids from the thus-treated oxidized hydrocarbons.

The process of this invention, in practical embodiment, may involve a continuous pyrolysis treatment in the presence of a catalyst in which a stream of the charge material is conducted into a heated, catalyst-containing conversion zone and rapidly vaporized therein. In this manner, the desired conversion and the primary separation of the acidic mixture into an overhead or distillate fraction and residual or bottoms fraction are accomplished in one heating operation. The treatment of the present invention desirably is conducted under atmospheric or subatmospheric pressure, the latter being preferred in permitting use of shorter contact time and thus decreasing any tendency for undesired decomposition to occur. Furthermore, the charge material may be treated with advantage in the presence of steam or an inert gas, e. g., nitrogen. As is apparent from the description herein of my invention, various apparatus and procedures for conducting the pyrolysis treatment in the presence of a catalyst may be employed, and furthermore, that operating conditions may vary somewhat with different types of apparatus and the particular results desired.

In order to further describe my invention, the following illustrative examples are set forth showing the markedly improved yields of dibasic acids obtained by practicing the present invention.

*Example I*

A refined paraffin wax of 120° F. melting point was subjected to liquid phase oxidation with air under controlled conditions until the residual oxidation product had a saponification value of 530 and an acid value of 336; that is, an acid/saponification ratio of 0.63.

This crude oxidation product was subjected to a pyrolysis treatment, without use of a catalyst, by continuously adding the crude product at a rate of three grams per minute to a heated flask maintained at 270–280° C. under a vacuum of about 10 mm. A total of about 296 grams was thus added, the rate of introduction of charge stock being sufficient to vaporize the charge in the flask almost immediately, and allow a contact time (residence time) of about 3 seconds in the heated zone. The overhead formed was condensed and collected in a receiver, followed by a dry ice trap to condense low boiling material, and a drying tube and ascarite tube to absorb water and carbon dioxide respectively. Break up of the crude acidic mixture was as follows:

| | Percent by weight |
|---|---|
| Overhead | 55 |
| Bottoms | 31 |
| Dry Ice trap contents | 1 |
| Water | 4 |
| Carbon dioxide | 1 |
| Loss | 8 |

The overhead fraction was distilled into three fractions under a vacuum of 4 mm., after which each fraction was filtered to obtain crude crystalline dibasic acids. The crude crystals were washed with two parts by weight of a 1:1 mixture of heptane and benzene to remove oily non-crystalline material adhering to the crude crystals. The three fractions had the properties as shown in the following tabulation, and the amount of dibasic acids obtained from each fraction were as set forth. The acid, saponification, and acid/saponification values set forth are the values of the dibasic acids yielded from each fraction.

Dibasic acid yield, grams

Fraction I:
  Boiling point 120–159° C. at 3 mm. pressure ---- 13.3
  Acid value 1092
  Saponification value 1070
  Acid/saponification value=about 1.0
Fraction II:
  Boiling point 159–201° C. at 6 mm. pressure ---- 7.1
  Acid value 862
  Saponification value 902
  Acid/saponification value=0.96
Fraction III:
  Boiling point 201–232° C. at 6 mm. pressure ---- 3.1
  Acid value 665
  Saponification value 640
  Acid/saponification value=1.1
    Total ---- 23.5

In the foregoing tabulation the acid and saponification values of the fractions were determined in water, and the substantially equivalent acid and saponification values in each fraction clearly shows that the fractions contained substantially pure acids.

After removal of the dibasic acids from the foregoing fractions, the filtrates from the fractions were combined and redistilled. An additional 4.7 grams of dibasic acids was thus obtained. Hence, a total yield of 28.2 grams of dibasic acids was obtained from the non-catalytic pyrolysis of the crude product, representing a yield of 9.5% of dibasic acids based on the charge.

*Example II*

In a manner identical to the foregoing example, 217 grams of the same charge stock was subjected to a pyrolysis treatment under identical conditions as in Example I, except that 145 grams of a catalyst was present in the flask with which the vaporized product in the flask was in contact. The catalyst employed was a silica-alumina cracking catalyst in the form of pellets.

Break up of the acidic mixture charged to the catalytic pyrolysis treatment was as follows:

| | Percent by weight |
|---|---|
| Overhead | 61 |
|     Acid value=465 | |
|     Saponification value=592 | |
|     Acid to saponification=0.78 | |
| Bottoms | 14 |
| Dry Ice trap contents | 5 |
| Water | 6 |
| Carbon dioxide | 4 |
| Loss | 10 |

The overhead was distilled into three fractions, and the crude crystals obtained from filtration of each fraction were washed in exactly the same manner as in Example I. The three fractions had the properties as shown in the following tabulation, and the amount of dibasic acids obtained from each fraction was as set forth, the acid, saponification, and acid/saponification values set forth being those of the dibasic acids yielded from each fraction.

| | Dibasic acid yield, grams |
|---|---|
| Fraction I: | |
|   Boiling point 102°–159° C. at 6 mm. pressure | 9.4 |
|     Acid value=1060 | |
|     Saponification value=1060 | |
|     Acid to saponification=1.0 | |
| Fraction II: | |
|   Boiling point 159°–201° C. at 6 mm. pressure | 11.7 |
|     Acid value=940 | |
|     Saponification value=960 | |
|     Acid to saponification=0.98 | |
| Fraction III: | |
|   Boiling point 201°–228° C. at 6 mm. pressure | 1.5 |
|     Acid value=682 | |
|     Saponification value=694 | |
|     Acid to saponification=0.98 | |
|     Total | 22.6 |

After removal of the dibasic acids from the foregoing fractions, the filtrates from the fractions were combined and redistilled. An additional yield of 6.3 grams of dibasic acids was obtained. Thus a total yield of 28.9 grams of dibasic acids was obtained, representing a yield of 13.3% of dibasic acids from the hydrocarbon charge subjected to the catalytic pyrolysis.

The foregoing results clearly show that by employing the catalytic pyrolysis method of the present invention, as compared to the same process except that the cracking catalyst is not used, the yield of dibasic acids from the same charge stock is materially increased. For example, in Example I, non-catalytic pyrolysis of the crude charge yielded 9.5% of dibasic acids, whereas, under otherwise identical conditions, the catalytic treatment of Example II yielded 13.3% of dibasic acids. In other words, by use of the process of the present invention, the yield of dibasic acids from the same charge was increased by about 40%.

The following additional example will serve to further illustrate the highly effective results obtained by practicing the present invention.

Example III

A refined paraffin wax of 120° F. melting point was subjected to liquid phase oxidation with a free oxygen-containing-gas under controlled conditions until the residual oxidation product reached a saponification value of 566 and an acid value of 342; that is, an acid/saponification value of 0.6.

The crude oxidation product was subjected to a pyrolysis treatment in the presence of a catalyst by charging the oxidized hydrocarbon through a pre-heat tube into the tube of a flask containing a silica-alumina cracking catalyst. The vaporized stock passed through the catalyst bed to a condenser and receiver, the distillation being conducted under a vacuum of 10–20 mm. absolute pressure. A summarized tabulation of the conditions employed is as follows:

| | |
|---|---|
| Analysis of charge: | |
|   Acid value | 342 |
|   Saponification value | 566 |
|   Acid saponification | 0.60 |
| Catalytic treating conditions: | |
|   Temperature (average) °C | 310 |
|   Contact time (calculated in seconds) | 2.6 |
|   Ratio of volume of charge stock/catalyst/hour | 2.4 |
| Analysis of distillate: | |
|   Per cent yield of distillate from charge stock | 70 |
|   Acid value | 404 |
|   Saponification value | 515 |
|   Acid/saponification | 0.78 |

Filtration of the distillate resulted in a 13% yield of dibasic acid crystals having an acid value of 582 and a saponification value of 560. Vacuum distillation of the filtrate into 2 cuts, and filtration of the cuts, yielded 3.3% of dibasic acid crystals of acid value of 539 and saponification value of 629 and 9% of crystals of acid value of 404 and a saponification value of 515. Redistillation of the non-crystalline portions of the two cuts yielded an additional 6% of dibasic acid crystals. Thus, the total yield of dibasic acid crystals, based on the weight of charge stock, was 31.3% which represents a marked improvement of about 50% in yield over a similar run, under similar conditions except that no catalyst was employed in which only about 20% of dibasic acid crystals were recovered.

Although, as set forth in the foregoing examples, the dibasic acids have been recovered from the distillate obtained by the catalytic pyrolysis of the crude oxidized hydrocarbons, it is within the scope of the invention to include similar treatment for recovery of dibasic acids from other complex acidic mixtures that contain dibasic acids or certain potentially acid constituents convertible to dibasic acids. For example, it is within the scope of the invention to thus treat the residual, or bottoms, fractions obtained from the catalytic pyrolytic treatment of the crude oxidized hydrocarbons. Examples of such residual fractions are those such as set forth in Examples I and II as bottoms obtained in the breakdown of the crude oxidized hydrocarbons. Analysis of such residual portions, i. e., the portion that does not vaporize and distill over, indicates that they are comprised mainly of highly oxygenated compounds and probably polyesters and polylactones averaging around four saponifiable groups per molecule, and having a substantially high average molecular weight, as for example, about 500. Certain of the oxygenated groups of these compounds are potentially acid, and acids may be recovered therefrom by suitable procedures. For instance, further yields of dibasic acids may be obtained, and other advantages realized by subjecting such residual materials or fractions thereof to a catalytic pyrolysis treatment in accordance with the present invention.

The exact reactions occurring during the catalytic pyrolysis treatment as embodied herein are not fully known and defy determination since both the charge material and the product of the treatment contain mono- and polyfunctional compounds whose chemistry is dependent not only on factors such as chain lengths, but also upon juxtaposition of other active groups. However, since the products of the catalytic pyrolysis treatment contain more readily crystallizable and distillable materials than the charge subjected to treatment, it would appear that such operation results in removal and/or decomposition of substances tending to inhibit crystallization of dibasic acids, as well as conversion of certain potentially acid constituents to dibasic acids.

The dibasic acid products from the catalytic treatment, fractions thereof, or mixed crystalline dibasic acids separated therefrom are useful without further treatment as chemical intermediates in the preparation of plastics and synthetic fibers or plasticizers, and for other purposes. However, individual crystalline dibasic acids may be separated therefrom and further purified, if desired. Succinic, glutaric, and suberic acids may be isolated by fractionation and recrystallization procedures, as well as dibasic acids in the carbon atom range of brassylic acid, having an acid value of 463, and dibasic acids in the range of pentadecanedioic ($C_{15}$) having an acid value of 420.

The improvement in yield and quality of the oxidized hydrocarbons treated in accordance with this invention is clearly evident by comparison of acid/saponification ratios of the crude charge stocks with those of the distillates obtained by catalytic pyrolysis treatment of such stocks. As evidenced by the data set forth hereinbefore, in each case, the distillates thus obtained had an acid/saponification value higher than the crude charge stock from which they were obtained. For example, in Example II, the charge stock had an acid/saponification ratio of 0.63 whereas the distillate from the catalytic pyrolysis thereof had a ratio of 0.78. Similarly, in Example III, the charge stock had an acid/saponification ratio of 0.6 whereas the distillate of the catalytic pyrolysis treatment had a ratio of 0.78. The fact that this ratio is materially greater in the case of the product than the charge indicates that the product contains more free carboxyl groups than the charge, and hence, that by subjecting the crude product to the catalytic pyrolysis treatment, certain potentially acid components are broken down or converted to free acids along with removal or decomposition of certain crystallization inhibiting substances without causing substantial, if any, decarboxylation, as evidenced by the high acid values of the distillates.

In the foregoing examples, the invention has been described, for purposes of illustration, by use of alumina-silica-containing compositions as catalysts for conducting the pyrolysis treatment. In setting forth such specific compositions, it is not intended that the present invention be limited thereto, as catalysts other than those set forth may be suitably employed. In order to illustrate the effective results obtained by use of other catalysts, the following tabulation sets forth several catalysts that were employed in conducting the catalytic pyrolysis treatment of an oxidized hydrocarbon distillate fraction as embodied for treatment herein having an acid value of 482 and a saponification value of 633, i. e., an acid/saponification ratio of 0.76. The treatment thereof was conducted at 300 to 330° C., using a catalyst to charge ratio of 1:3, and contact time of about 2 minutes. As shown by the data in the following table, in each case, the acid/saponification ratio of the distillate was higher than the 0.76 ratio of the charge stock, illustrating that the percentage of free carboxyl groups was increased by subjecting the charge stock to the catalytic treatment.

| Catalyst | Acid Value | Distillate | |
|---|---|---|---|
| | | Saponification value | Acid/Saponification |
| Silica ($SiO_2$) | 453 | 543 | 0.83 |
| Alumina ($Al_2O_3$) | 392 | 504 | 0.78 |
| 10% ZnO on Silica | 414 | 515 | 0.80 |
| 10% Cobalt on Silica | 420 | 509 | 0.83 |

Although, as illustrated hereinbefore, the present invention may be satisfactorily practiced with various types of cracking catalysts, silica-containing catalysts generally are employed, as for example, silica, silica-alumina, various metal oxides, e. g., zinc oxide on silica, certain metals, e. g., cobalt on silica, and the like. The catalysts may be suitably employed in various forms, as for example, in the form of pellets, beads, etc. In a preferred embodiment, silica-alumina containing catalysts, such as widely employed for catalytic cracking of hydrocarbons, are employed as use of such compositions appear to provide effectively high yields of dibasic acid crystals from charge stocks subjected to treatment in accordance with this invention.

As set forth hereinbefore, the oxidized hydrocarbons embodied herein for charge materials to the catalytic pyrolysis treatment have saponification values of at least 400 and an acid value lower than the saponification value. The intermediate compounds that inhibit crystallization of dibasic acids in the charge stock, that is, the compounds making up the difference between the acid and saponification values of the charge appear to be complex in structure, and hence, the exact structure thereof is not readily ascertainable. However, analysis thereof shows that the compounds accounting for the difference between the saponification and acid values give lactone and ester values, with the lactone value generally being substantially greater than the ester value. Hence, it appears that the carboxyl groups of the greater proportion of the intermediate compounds are bound by certain linkages, for example, such as are present in lactones. As an illustration, the following is an example of an analysis of an oxidized hydrocarbon fraction, suitable as a charge stock in practicing this invention, along with the corresponding analysis of the distillate, obtained in 45% yield, resulting from the catalytic pyrolysis of the oxidized hydrocarbon in accordance with the method of this invention:

| Charge | Distillate |
|---|---|
| Acid Value, 409 | 325 |
| Lactone Value, 218 | 84 |
| Ester Value, 17 | 17 |
| Saponification Value, 644 | 426 |

The foregoing data clearly illustrates not only the material improvement obtained in acid: saponification ratio of the distillate over the charge stock, but also, that the compounds giving a lactone value were preferentially decomposed as evidenced by the material decrease in lactone value. Since compounds having their carboxylic groups bound, such as by lactone linkages, are generally understood to be more heat stable than corresponding compounds thereof in which the carboxylic groups are not bound, as in the corresponding dibasic acids, it is apparent that practice of the present invention in subjecting the charge stock embodied herein to catalytic pyrolysis with preferential decomposition of the intermediate compounds, giving lactone values, in mixture thereof with dibasic acids, provides a novel and unexpected result.

Although the present invention has been described in conjunction with certain preferred embodiments thereof, those skilled in the art will readily recognize that variations and modifications can be made. Such variations and modifications are to be considered to be within the purview of the specification and the scope of the appended claims.

I claim:
1. A method for improving the yield of crystalline polybasic acids from a non-crystalline polybasic acid-containing-oxidized mixture obtained by liquid phase oxidation of a predominantly paraffinic hydrocarbon mixture with a free oxygen-containing gas, said oxidized mixture having a saponification value of at least about 400 and an acid value substantially less than the saponification value and further characterized by containing, as components accounting for a substantial portion of the difference between the aforesaid acid and saponification values, oxygenated compounds inhibiting crystallization of polybasic acids in said oxidized mixture, which comprises subjecting said oxidized mixture at a distillation temperature therefor to contact with a catalyst comprising a metal oxide from the group consisting of alumina and silica and mixtures thereof for a period of time sufficient to decompose a substantial portion of said crystallization-inhibiting compounds without effecting substantial decomposition of the polybasic acids in said mixture to provide a distillate containing a substantial amount of polybasic acids in crystalline form.

2. A method, as defined in claim 1, wherein the oxidized mixture is subjected to contact with the catalyst at a temperature of about 200° C. to about 400° C.

3. A method, as defined in claim 1, wherein the oxidized mixture is subjected to contact with the catalyst at about 200° C. to about 400° C. for about 0.5 to about 5 seconds.

4. A method, as defined in claim 1, wherein the crystalline polybasic acids are separated from the distillate.

5. A method for improving the yield of crystalline polybasic acids from a non-crystalline polybasic acid-containing oxidized mixture obtained by liquid phase oxidation of a predominantly paraffinic hydrocarbon mixture with a free oxygen-containing gas, said oxidized mixture having a saponification value of at least about 400 and an acid value substantially less than the saponification value and further characterized by containing, as components accounting for a substantial portion of the difference between the aforesaid acid and saponification values, oxygenated compounds inhibiting crystallization of polybasic acids in said oxidized mixture, which comprises subjecting said oxidized mixture at a distillation temperature therefor to contact with a catalyst effective at said temperature to decompose said crystallization-inhibiting compounds in preference to decomposition of polybasic acids in said oxidized mixture to provide a distillate containing a substantial amount of polybasic acids in crystalline form.

6. A method for improving the yield of crystalline polybasic acids from a non-crystalline polybasic acid-containing-oxidized mixture obtained by liquid phase oxidation of a predominantly paraffinic hydrocarbon mixture with a free oxygen-containing gas, said oxidized mixture having a saponification value of over 400 and an acid value substantially less than the saponification value and further characterized by containing, as components accounting for a substantial portion of the difference between the aforesaid acid and saponification values, oxygenated compounds inhibiting crystallization of polybasic acids in said oxidized mixture, which comprises subjecting said oxidized mixture at a distillation temperature therefor to contact with a hydrocarbon cracking catalyst comprising an oxide of a metal from the group consisting of aluminum and silicon and mixtures thereof for a period of time sufficient to decompose a substantial portion of said crystallization-inhibiting compounds without affecting substantial decomposition of polybasic acids in said mixture to provide a distillate containing a substantial amount of polybasic acids.

7. A method, as defined in claim 6, wherein the oxidized mixture is subjected to contact with the catalyst at a temperature of about 200° C. to about 400° C.

8. A method, as defined in claim 6, wherein the oxidized mixture is subjected to contact with the catalyst at a temperature of about 200° C. to about 400° C. for about 0.5 to about 5 seconds.

9. A method for obtaining improved yields of crystalline polybasic acids from a non-crystalline polybasic acid-containing-oxidized mixture obtained by liquid phase oxidation of a predominantly paraffinic hydrocarbon mixture with a free oxygen-containing gas, said oxidized mixture having a saponification value of more than 400 and an acid value substantially less than the saponification value and further characterized by containing, as components accounting for a substantial portion of the difference between the aforesaid acid and saponification values, oxygenated compounds inhibiting crystallization of the non-crystalline polybasic acids in said oxidized mixture, which comprises subjecting said oxidized mixture at a temperature of about 200° to about 400° C. to contact for about 0.5 to about 5 seconds with a catalyst comprising a metal oxide from the group consisting of silica and alumina and mixtures thereof to provide a distillate containing a substantial amount of polybasic acids in crystalline form.

10. A method, as defined in claim 9, wherein the crystalline polybasic acids are separated from the distillate.

11. A method for obtaining improved yields of crystalline polybasic acids from a non-crystalline polybasic acid-containing-oxidized mixture obtained by liquid phase oxidation of a predominantly paraffinic hydrocarbon mixture with a free oxygen-containing gas, said oxidized mixture having a saponification value of more than about 400 and an acid value substantially less than the saponification value and further characterized by containing, as components accounting for a substantial portion of the difference between the aforesaid acid and saponification values, oxygenated compounds inhibiting crystallization of the non-crystalline polybasic acids in said oxidized mixture, which comprises subjecting said oxidized mixture at a temperature of about 200° to about 400° C. to contact for about 0.5 to about 5 seconds with a catalyst effective, under said temperature and time conditions, to decompose said crystallization-inhibiting compounds in preference to decomposition of polybasic acids in said oxidized mixture to provide a distillate containing a substantial amount of polybasic acids in crystalline form.

CARL N. ZELLNER.

REFERENCES CITED

The following references are of record in the file of this patent:

UNITED STATES PATENTS

| Number | Name | Date |
|---|---|---|
| 1,940,400 | Dietrich | Dec. 19, 1933 |
| 1,965,961 | Luther et al. | July 10, 1934 |
| 2,055,095 | Beller et al. (B) | Sept. 22, 1936 |
| 2,059,201 | Beller et al. (A) | Nov. 3, 1936 |
| 2,059,232 | Harder | Nov. 3, 1936 |

FOREIGN PATENTS

| Number | Country | Date |
|---|---|---|
| 433,780 | Great Britain | Aug. 14, 1935 |